United States Patent
Begley et al.

(10) Patent No.: US 8,721,837 B2
(45) Date of Patent: May 13, 2014

(54) METHOD FOR RECOVERING PULPING CHEMICALS AND REDUCING THE CONCENTRATION OF POTASSIUM AND CHLORIDE THEREIN

(71) Applicant: Veolia Water Solutions & Technologies North America, Inc., Moon Township, PA (US)

(72) Inventors: Michael S. Begley, Lisle, IL (US); Jean-Claude Gallot, Naperville, IL (US)

(73) Assignee: Veolia Water Solutions & Technologies North America, Inc., Moon Township, PA (US)

( * ) Notice: Subject to any disclaimer, the term of this patent is extended or adjusted under 35 U.S.C. 154(b) by 0 days.

(21) Appl. No.: 13/709,140

(22) Filed: Dec. 10, 2012

(65) Prior Publication Data
US 2014/0027076 A1 Jan. 30, 2014

Related U.S. Application Data

(60) Provisional application No. 61/676,102, filed on Jul. 26, 2012.

(51) Int. Cl.
*D21C 11/06* (2006.01)
*D21C 11/12* (2006.01)

(52) U.S. Cl.
CPC ............ *D21C 11/066* (2013.01); *D21C 11/063* (2013.01); *D21C 11/12* (2013.01)
USPC ......................................... 162/44; 162/30.11

(58) Field of Classification Search
CPC ...... D21C 11/10; D21C 11/12; D21C 11/122; D21C 11/063; D21C 11/066; D21C 11/0007
USPC ............................................................. 162/44
See application file for complete search history.

(56) References Cited

U.S. PATENT DOCUMENTS 3,954,552 A 5/1976 Lukes et al.
3,966,541 A * 6/1976 Sadan .......................... 159/47.1
(Continued)

FOREIGN PATENT DOCUMENTS

WO 2011002354 A1 1/2011

OTHER PUBLICATIONS

Frost et al., Georgia Pacific letter describing an HPD CRP system for sale, 2009, Georgia Pacific.*

(Continued)

*Primary Examiner* — Anthony Calandra
(74) *Attorney, Agent, or Firm* — Coats and Bennett, PLLC

(57) ABSTRACT

In a digester, wood chips and white liquor are combined and cooked under pressure to pulp the wood. This produces black liquor which is concentrated and burned in a recovery boiler. The recovery boiler produces ash that contains sodium, sulphur, potassium and chloride. The ash is dissolved and subjected to a process that recovers sodium sulfate and burkeite. The concentration of potassium and chloride is reduced, in part at least, by subjecting the ash to adiabatic cooling in a crystallizer which produces glaserite and a purge stream rich in chloride. By leaching the glaserite, sodium sulfate is removed from the glaserite, leaving potassium sulfate. The recovered sodium sulfate and burkeite can be recycled and used as pulping chemicals. The removed potassium and chloride can be further treated or appropriately discarded.

21 Claims, 4 Drawing Sheets

(56) References Cited

U.S. PATENT DOCUMENTS

| | | | |
|---|---|---|---|
| 4,088,451 A * | 5/1978 | Sadan | 23/295 S |
| 5,549,788 A * | 8/1996 | Nykanen et al. | 162/29 |
| 5,922,171 A | 7/1999 | Paleologou et al. | |
| 2009/0294377 A1* | 12/2009 | Gallot | 210/737 |
| 2011/0067829 A1 | 3/2011 | Foan et al. | |

OTHER PUBLICATIONS

Honkanen et al., Experiences in Various Chloride Removal Technologies, 2010, TAPPI/PAPTAC International Chemical Recovery Conference.*

* cited by examiner

METHOD FOR RECOVERING PULPING CHEMICALS AND REDUCING THE CONCENTRATION OF POTASSIUM AND CHLORIDE THEREIN

CROSS REFERENCE TO RELATED APPLICATION

This application claims priority under 35 U.S.C. §119(e) from the following U.S. provisional application: Application Ser. No. 61/676,102 filed on Jul. 26, 2012. That application is incorporated in its entirety by reference herein.

FIELD OF THE INVENTION

The present invention relates to pulping wood, and more particularly to the recovery of pulping chemicals.

BACKGROUND OF THE INVENTION

In a wood pulping process, wood chips are fed into a digester. Typically, the digester is pressurized and operates at about 160-180° C. An aqueous solution, white liquor (typically comprised of NaOH and $Na_2S$), is mixed with the wood chips. The white liquor or chemical pulping material neutralizes the organic acids in the chemical matrix of the wood. Lignin and other organic material, which contribute to about one-half of the mass of the wood, dissolve into the white liquor and exit the digester as weak black liquor. The remaining material, pulp, constitutes the wood fiber that is used in the papermaking process.

The weak liquor typically has a solids content of approximately 15% by weight, which is too low for combustion. To raise the solids content of the weak black liquor, the weak black liquor is typically concentrated in multi-effect evaporators until its solids content is approximately 65-85%. Thereafter, the concentrated weak black liquor is referred to as concentrated black liquor.

Many pulp mills employ what is referred to as the Kraft chemical recovery process. This process has three main objectives: (1) minimizing the environmental impact of waste material (black liquor) from the pulping process; (2) recycling pulping chemicals that form NaOH and $Na_2S$; and (3) generating steam and power.

The Kraft chemical recovery process begins by directing the black liquor to a recovery boiler. Concentrated black liquor is sprayed into a lower part of the recovery boiler, where it is burned in an oxygen deficient environment so that sodium sulfide ($Na_2S$) is formed. The inorganic sodium and sulphur are removed as molten smelt, which consists mainly of $Na_2S$ and sodium carbonate ($Na_2CO_3$). The molten smelt is directed to a dissolving tank, where it is dissolved in water to form what is referred to as green liquor. The green liquor is directed to a causticizing plant where it is reacted with lime, CaO, to convert the $Na_2CO_3$ to NaOH. The causticized green liquor is known as "white liquor," which contains mostly NaOH and $NA_2S$. It is returned to the digester for reuse in pulping. Precipitated $CaCO_3$ (sometimes referred to as lime mud) from the causticizing reaction is washed and sent to a lime kiln, where it is heated to high temperature to regenerate CaO for reuse.

Chlorine (Cl), present in mills in the form of chloride, and potassium (K) are known to have a negative impact on the operation of chemical recovery processes in pulp mills. These elements, despite their small quantities in black liquor, can drastically lower the melting temperature of fly ash deposits and contribute to severe fouling and corrosion of heat transfer tubes in recovery boilers.

Chloride and potassium are concentrated in the ash formed during the combustion of black liquor in the recovery boiler. The ash mainly consists of sodium and potassium salts, wherein sulfate, carbonate, and chloride make up the dominant anions.

Presently most, if not all, of the precipitator ash collected and withdrawn from the recovery boiler is recycled to the black liquor to be burned in the boiler. When the concentration of the chloride or potassium becomes elevated, a portion of the precipitator ash is purged from the system.

As pulp mills have tightened their liquor cycle in recent years to improve spill control and decrease chemical losses, chloride and potassium concentrations in the mill liquor have increased, causing problems in recovery boiler operations. This has led to renewed interest in chloride and potassium removal.

DESCRIPTION OF EXEMPLARY EMBODIMENT OF THE INVENTION

Figure 1:
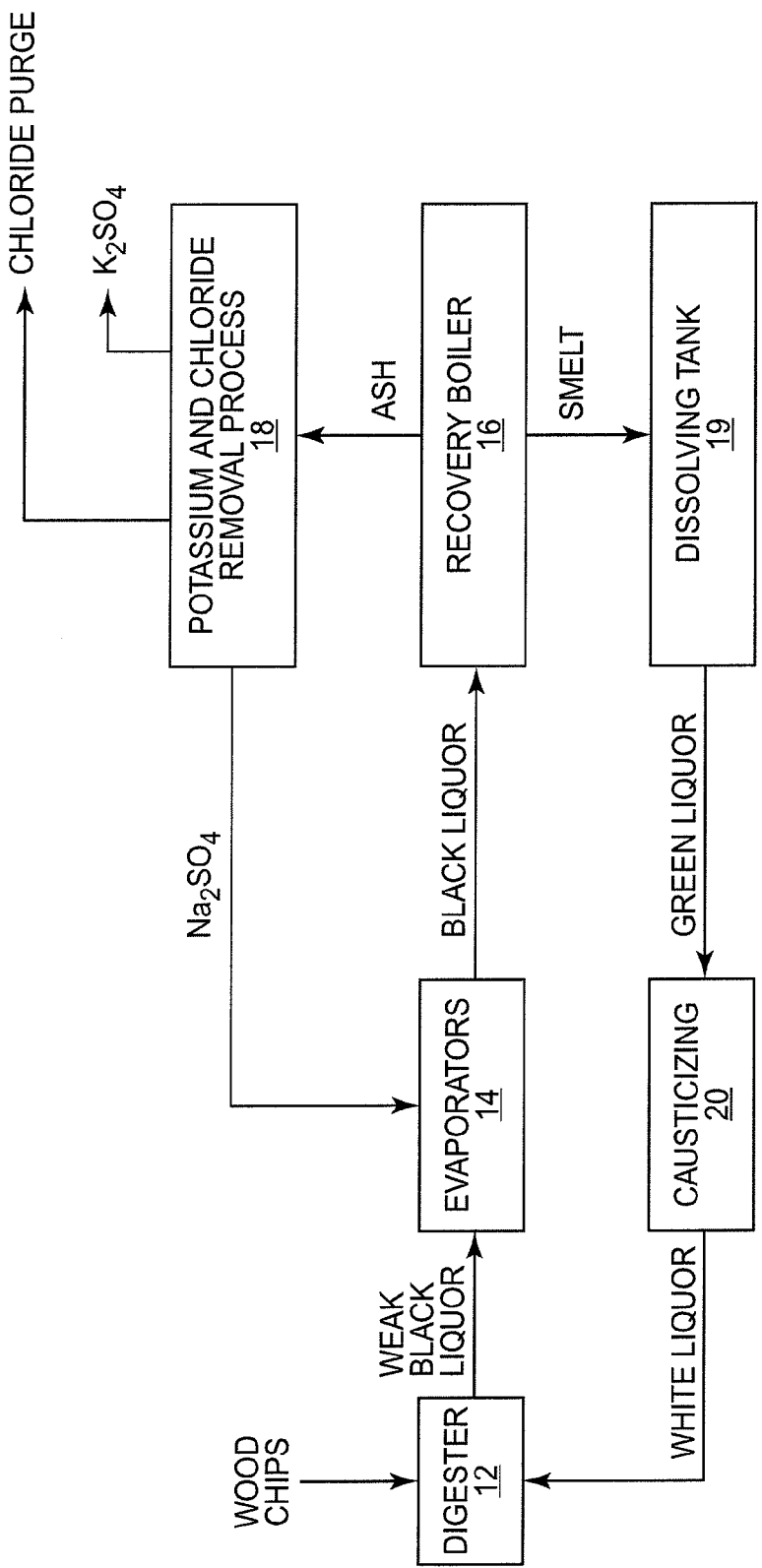
FIG. 1 is a schematic illustration showing a process for pulping wood, which incorporates a chemical recovery process that reduces the concentration of potassium and chloride in black liquor.

With reference to FIG. 1, there is shown therein a method for removing pulp from wood and recovering pulping chemicals. As will be discussed herein, the chemical recovery process includes process units or elements that reduce the concentration of chloride and potassium commonly found in the black liquor produced by pulping wood.

Referring to FIG. 1, wood chips are directed into a digester 12. The wood chips are mixed with pulping chemicals typically referred to as white liquor. The white liquor contains sodium hydroxide (NaOH) and sodium sulfide ($Na_2S$). Digester 12 is operated under pressure and, in a typical process, the wood chips are cooked at a temperature on the order of 160-180° C. White liquor in the digester neutralizes the organic acids in the chemical matrix of the wood. Lignins and other organic material dissolve into the white liquor. The remaining material is pulp or wood fiber used in the papermaking process. The white liquor is discharged from the digester 12 and, once discharged, the white liquor is referred to as weak black liquor.

The weak black liquor is directed to an evaporator or a series of evaporators 14 (such as multi-effect evaporators) where the weak black liquor is concentrated. Weak black liquor typically has a solids content of about 15% by weight, which is far too low for combustion. Typically, weak black liquor is concentrated in a multi-effect evaporator network.

While the degree of concentration can vary, generally the weak black liquor is concentrated to approximately 65-85 wt % of dry solids. Once concentrated in the evaporators 14, the weak black liquor is referred to as concentrated black liquor.

Chemically, black liquor is a mixture of several basic chemical constituents where the largest fractions are carbon, oxygen, sodium, and sulphur. Other constituents typically found in black liquor include hydrogen, potassium, chlorine, and nitrogen.

After the weak black liquor has been concentrated in the evaporators 14 to form concentrated black liquor, the concentrated black liquor is subjected to a process for recovering pulping chemicals contained therein. As illustrated in FIG. 1, the concentrated black liquor is directed to a recovery boiler 16.

Typically the black liquor concentrated by the evaporators 14 is at a temperature of approximately 120° C. The black liquor is sprayed into the recovery boiler 16, which is typically operated at approximately 900° C. Effectively, the black liquor is atomized to droplets that, when sprayed into the recovery boiler 16, are exposed to hot gases and will undergo drying, pyrolysis, and char conversion. At the end of the char conversation, the droplets have been converted to small particles of smelt that generally consist of inorganic material, $Na_2S$, $Na_2CO_3$, $Na_2SO_4$, and NaCl in ionic form. The char conversion is usually completed before the smelt exits the boiler. The resulting combustible gases are burned completely. This produces steam in surrounding water pipes of the boiler. The steam is then used in other mill processes and is typically used to drive a steam turbine that produces electrical energy.

The resulting smelt enters a dissolving tank 19 where the smelt is dissolved in water to form what is referred to as green liquor. The green liquor is then sent to a causticizing plant 20, where the green liquor is reacted with lime, CaO, to convert the $Na_2CO_3$ to NaOH. The $Na_2S$ formed in the dissolving tank 19 simply passes through the causticizing plant 20 unchanged.

The causticized green liquor is referred to as white liquor and mostly contains NaOH and $Na_2S$. The white liquor produced by the causticizing plant is returned to the digester for reuse in pulping. In the causticizing plant 20, $CaCO_3$ (lime mud) is precipitated. The precipitated $CaCO_3$ from the causticizing reaction is washed, and sent to a lime kiln where it is heated to a high temperature to regenerate CaO for reuse.

A major problem with pulping chemical recovery systems is the presence of chloride and potassium in the black liquor entering the recovery boiler 16. These elements tend to reduce the capacity of the recovery boiler to produce useful chemicals. More particularly, chloride and potassium increase the stickiness of carryover deposits and ash particles to the recovery boiler tubes, which gives rise to fouling and plugging in the upper part of the recovery boiler. In addition, chloride also tends to increase the corrosion rate of super heated tubes.

Chloride and potassium enter the mill liquor cycle with wood and make up chemicals. Depending on the wood species, how they are transported to the mill, and the amount and type of make up chemicals, chloride and potassium inputs will vary. Once in the liquor cycle, however, chloride and potassium continue to accumulate until they reach a steady state concentration. In the way of an example, for inland mills, the chloride content of the black liquor typically varies from about 0.2 to about 0.6 wt % as dry solids, and higher to approximately 1-2 wt % for mills that use caustic make up contaminated with sodium chloride. For coastal mills where seaborne logs are used, the chloride content is much higher, approximately 3-5 wt %. The potassium content of black liquor typically varies from about 0.8 to 1.5 wt % as dry solids for softwood mills and even higher to approximately 2 to approximately 5 wt % for hardwood mills.

As pulp mills have tightened their liquor cycle in recent years to improve spill control and decrease chemical losses, chloride and potassium concentrations in mill liquor have increased, causing problems in recovery boiler operation.

Due to their high volative nature at high temperatures, chloride and potassium compounds (e.g. NaCl and KCl) vaporize from the recovery boiler char bed and become enriched in the precipitator ash produced by the recovery boiler 16. For years pulp mills have purged a portion of the precipitator ash to control chloride and potassium levels. Although chloride and potassium are concentrated in the ash, they amount to only about 4 to 20 wt % of the ash. The remainder of the material being purged with the ash is sodium, sulfate, and carbonate. This means that make up sodium and sulfur must be added to the liquor cycle when precipitator ash is purged.

The present invention relates to a process to remove chloride and potassium from the ash without sacrificing substantial amounts of pulping chemicals. As indicated in FIG. 1, the ash from the recovery boiler 16 is directed to a potassium and chloride removal process referred to in FIG. 1 by the numeral 18. As shown in FIG. 1, the potassium and chloride removal process 18 is designed to remove potassium in the form of potassium sulfate ($K_2SO_4$) or glaserite ($3K_2SO_4 \cdot Na_2SO_4$) and to generate one or more purge streams relatively rich in chloride. At the same time, the potassium and chloride removal process recovers sodium sulfate that is returned to the plant for use in generating pulping chemicals or white liquor.

Figure 2:
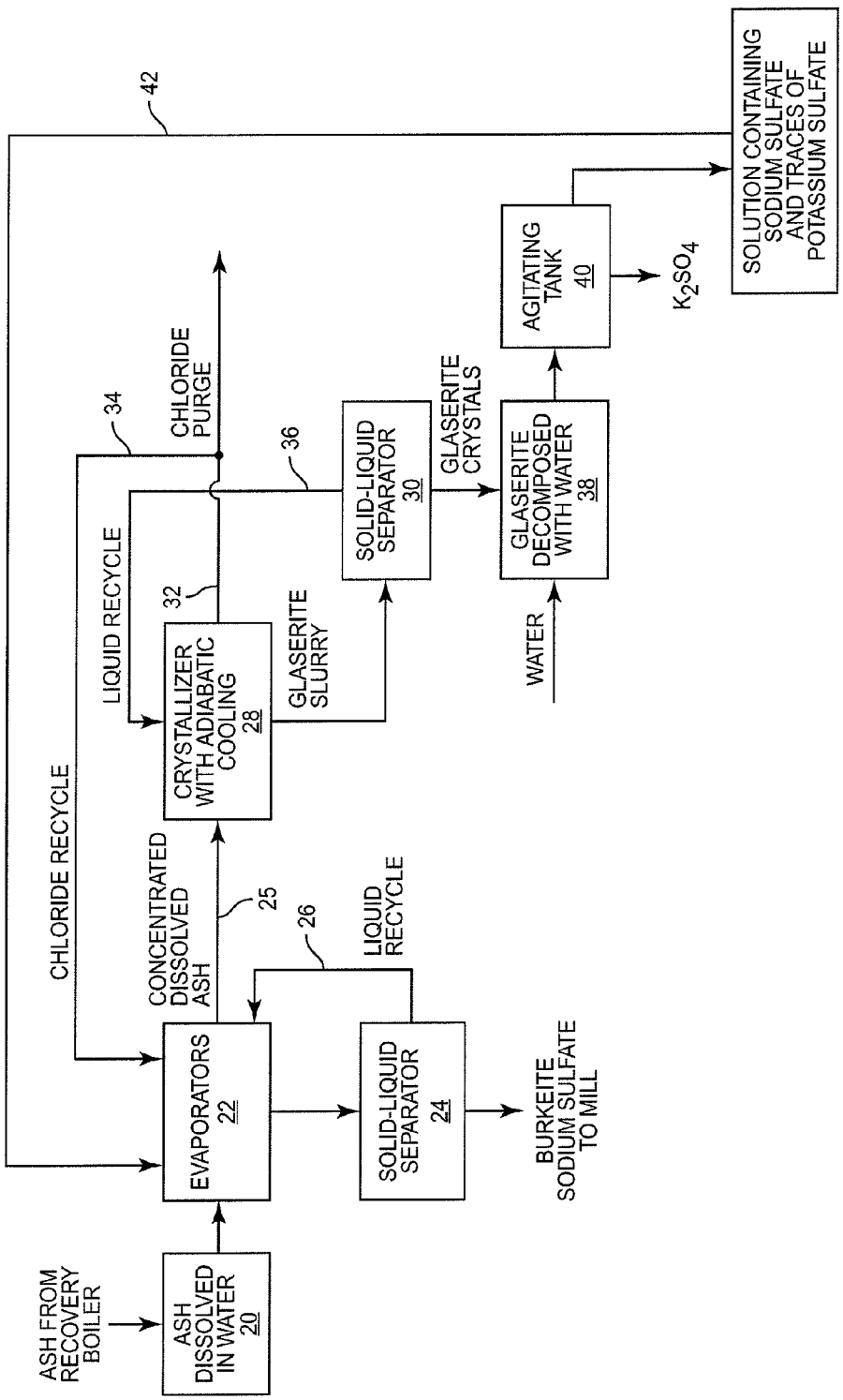
FIG. 2 is a schematic illustration of a portion of the chemical recovery process particularly illustrating processes for removing potassium, chloride and precipitator ash recovered from the recovery boiler.

Turning to FIG. 2, ash from the recovery boiler 16 is directed to tank 20, where the ash is dissolved in water. In some cases, all or substantially all of the ash from the recovery boiler 16 is directed to tank 20. In other cases, only a portion of the ash from the recovery boiler 16 is directed to tank 20. In any event, ash directed into tank 20 is dissolved to form a dissolved ash solution. The dissolved ash solution is directed to an evaporator or a series of evaporators 22. The evaporators 22 concentrate the dissolved ash solution causing sodium sulfate and burkeite ($2Na_2SO_4 \cdot Na_2CO_3$) to precipitate and form crystals. A concentrate including the precipitated burkeite and sodium sulfate is directed to a solid-liquid separator 24 that separates the burkeite and sodium sulfate from the concentrate. The separated concentrate is recycled back to the evaporators 22 via line 26. The evaporators 22 produce a concentrated purge stream 25 that is relatively rich in chloride and potassium.

The concentrated purge stream 25 is directed to a glaserite crystallizer 28. Once in the crystallizer 28, the concentrated purge stream is subjected to cooling, and preferably adiabatic cooling. Adiabatic cooling is the decrease of the temperature of a system without the removal of heat. One common method of adiabatic cooling is to lower the pressure; because the temperature and pressure of a closed system are directly proportional, decreasing one will result in the decrease of the other. In one embodiment, the adiabatic cooling process is carried out until the evaporator reaches a temperature of approximately 35° C. In the crystallizer 28, the adiabatic cooling process will cause glaserite ($3K_2SO_4 \cdot Na_2SO_4$) to crystallize. This forms a concentrated glaserite slurry that is directed from the crystallizer 28 to a solid-liquid separator 30. In the process of adiabatically cooling the concentrated purge stream 25 from the evaporators 22, the crystallizer 28 produces another purge stream 32. Purge stream 32 includes a relatively rich concentration of chloride. Purge stream 32, having the relatively rich concentration of chloride, can be further treated or disposed of by conventional means. A portion of the concentrated purge stream 32 can be recycled via line 34 to the evaporators 22. The amount of the purge stream 32 directed from the plant or recycled back to the evaporators 22 will vary depending upon the concentration of stream 32 and the concentration of chloride found in the black liquor directed to the recovery boiler 16.

The glaserite slurry produced by the adiabatic cooling crystallizer 28 is directed to the solid-liquid separator 30. Various types of solid-liquid separators can be employed such as filters, centrifuge, clarifier, etc. Solid-liquid separator 30 separates the glaserite slurry into glaserite crystals and a liquid recycle stream 36. In the embodiment illustrated herein, the liquid recycle stream 36 is recycled back to the crystallizer 28.

The separated glaserite crystals are directed to a decomposing tank or chamber 38. Here, water or an aqueous solution is mixed with the glaserite and what follows is a leaching process. In tank 38 the leaching process begins. Because of the differences in solubility, sodium sulfate is leeched from the glaserite crystals and becomes dissolved in the water or aqueous solution contained in tank 38. The mixture of glaserite crystals and water is directed to an agitating tank 40 where the glaserite crystals and water are mixed. The leaching process continues in the agitating tank 40. This produces a sodium sulfate solution that is recycled via line 42 to the crystallizer 28. Also the recycled sodium sulfate solution will include a significant amount of potassium sulfate. Once the sodium sulfate has been leached from the glaserite crystals, it follows that what is left is potassium sulfate ($K_2SO_4$) crystals. The potassium sulfate is removed and can be used in producing fertilizer or can be disposed of in conventional ways.

Figure 3:
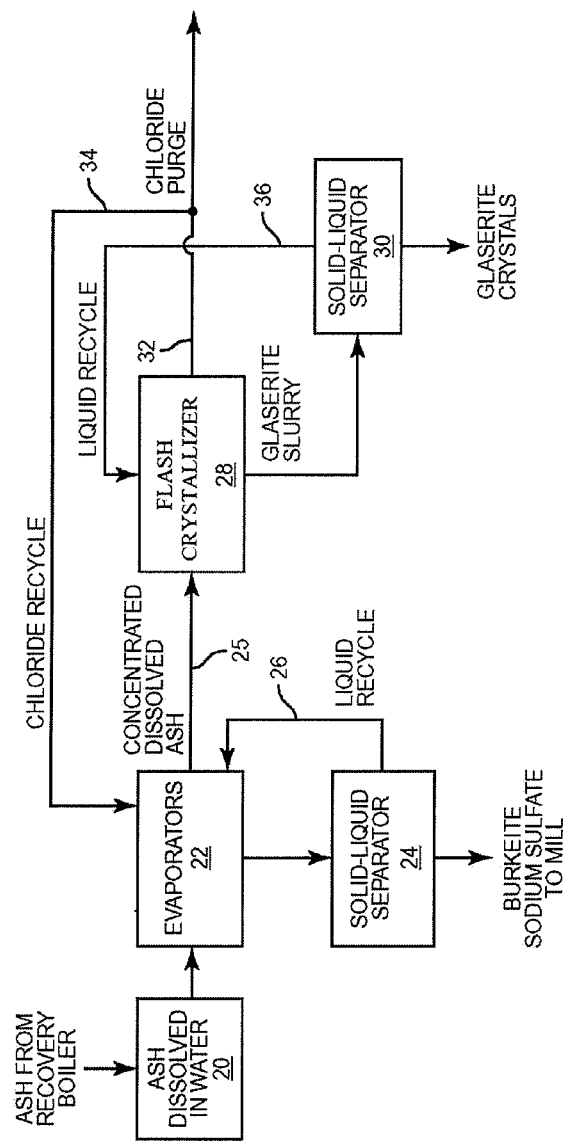
FIG. 3 is a schematic illustration of another embodiment of a portion of the chemical recovery process particularly illustrating processes for removing potassium, chloride and precipitator ash recovered from the recovery boiler.

FIG. 3 depicts an alternative embodiment of the processes described herein. The FIG. 3 embodiment is similar to the FIG. 2 embodiment, in that both dissolve ash in water 20 and subject the resultant product to evaporation in evaporators 22. In the FIG. 3 embodiment, the concentrated dissolved ash from evaporators 22 is directed to a flash crystallizer 28. In some embodiments, flash crystallizer 28 may be an adiabatic crystallizer, while in others, flash crystallizer 28 may allow for addition of heat and/or water to control glaserite crystal production. Flash crystallizer 28 cools the concentrated dissolved ash to a temperature of approximately 35° C., which results in glaserite crystallizing and forming a glaserite slurry and a chloride solution. The chloride solution is recycled to evaporators 22. The slurry is removed from flash crystallizer 28 and sent to solid-liquid separator 30, where glaserite crystals are separated out. These glaserite crystals may then be disposed of or used as a fertilizer. The liquid from solid-liquid separator 30 is recycled to flash crystallizer 28.

Figure 4:
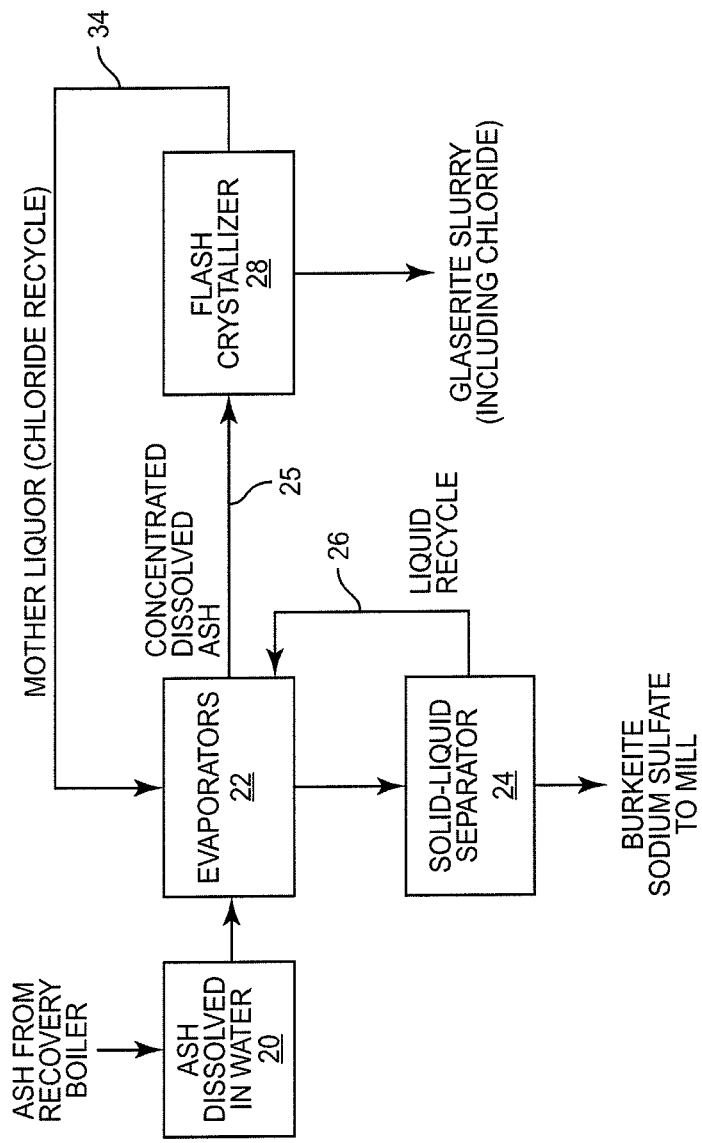
FIG. 4 is a schematic illustration of another embodiment of a portion of the chemical recovery process particularly illustrating processes for removing potassium, chloride and precipitator ash recovered from the recovery boiler.

FIG. 4 depicts another alternative embodiment of the processes described herein. As with the FIGS. 2 and 3 embodiments, the FIG. 4 embodiment dissolves ash in water 20 and subjects the product therefrom to evaporation in evaporators 22. The concentrated dissolved ash from evaporators 22 is then directed to flash crystallizer 28. As with the FIG. 3 embodiment, flash crystallizer 28 may be adiabatic or may allow for addition of heat and/or water to control glaserite crystal production. flash crystallizer 28 cools the concentrated dissolved ash to a temperature of approximately 35° C., causing glaserite to crystallize and form a glaserite slurry that contains chloride solution. The glaserite slurry with chloride solution may then be removed from the process and disposed of, eliminating both potassium and chloride. In addition, the flash crystallizer 28 produces a mother liquor that is recycled via line 34 back to the one or more evaporators 22. This line is referred to in FIG. 4 as a chloride recycle line as the mother liquor includes chloride. In addition, a portion of the mother liquor produced by the flash crystallizer 28 and directed out line 34 can be selectively purged in order to remove chloride from the concentrated dissolved ash solution.

Therefore, it follows that the processes of FIGS. 2-4 remove substantial chloride from the ash, as well as potassium in the form of glaserite and/or potassium sulfate. However, the process shown in FIG. 2 not only removes chloride and potassium in a single overall process, but the process disclosed in FIG. 2 also recovers sodium sulfate that can be eventually converted to pulping chemicals and used in the digester 12 shown in FIG. 1.

The present invention may, of course, be carried out in other ways than those specifically set forth herein without departing from essential characteristics of the invention. The present embodiments are to be considered in all respects as illustrative and not restrictive, and all changes coming within the meaning and equivalency range of the appended claims are intended to be embraced therein.

What is claimed is:

1. A method of removing pulp from wood and recovering pulping chemical from black liquor while reducing the concentration of potassium and chloride in the black liquor, comprising:
    digesting wood in a digester and separating pulp from the wood and producing the black liquor;
    concentrating the black liquor forming concentrated black liquor;
    directing the concentrated black liquor to a recovery boiler and burning the concentrated black liquor and, in the process, producing ash that contains potassium, chloride and sodium;
    reducing the concentration of potassium and chloride in at least a portion of the ash while recovering sodium from the ash by:
    i. mixing the ash with an aqueous solution and dissolving the ash in the aqueous solution to form a dissolved ash solution;
    ii. concentrating the dissolved ash solution, thus forming a concentrated dissolved ash solution and forming precipitated sodium sulfate and precipitated sodium carbonate;
    iii. separating the precipitated sodium sulfate and the precipitated sodium carbonate; and then
    iv. directing the concentrated dissolved ash solution to a crystallizer and adiabatically cooling the concentrated dissolved ash solution to produce a glaserite slurry and a purge stream containing chloride.

2. The method of claim 1 including directing the glaserite slurry to a solid-liquid separator and separating glaserite crystals from the glaserite slurry.

3. The method of claim 2 wherein the solid-liquid separator also produces a liquid recycle stream and wherein the liquid recycle stream is recycled to the crystallizer that produces the glaserite slurry.

4. The method of claim 1 wherein concentrating the dissolved ash solution includes evaporating the dissolved ash solution in an evaporator which precipitates sodium sulfate and sodium carbonate.

5. The method of claim 1 wherein the precipitated sodium carbonate forms a part of precipitated burkeite.

6. The method of claim 4 wherein evaporating the dissolved ash solution also precipitates burkeite.

7. The method of claim 2 including separating sodium sulfate from the glaserite crystals by leaching the sodium sulfate from the glaserite crystals.

8. The method of claim 1 including recycling a portion of the purge stream containing chloride to an evaporator that concentrates the dissolved ash solution.

9. The method of claim 2 wherein the solid-liquid separator that separates glaserite crystals from the glaserite slurry produces a liquid recycle stream containing chloride that is recycled to the crystallizer.

10. The method of claim 7 including recycling the sodium sulfate separated from the glaserite crystals to one or more evaporators that concentrate the dissolved ash solution in step (ii).

11. The method of claim 1 including: (1) recycling at least a part of the purge stream containing chloride to one or more evaporators located upstream of the crystallizer.

12. A method recovering wood pulping chemicals from black liquor produced in a wood pulping process in a pulp mill, comprising:
    burning the black liquor in a recovery boiler and forming ash containing sodium, potassium and chloride;
    dissolving at least a portion of the ash to form a dissolved ash solution;
    directing the dissolved ash solution to one or more evaporators and concentrating the dissolved ash solution and precipitating sodium sulfate forming a concentrated dissolved ash solution and precipitated sodium sulfate;
    recovering the precipitated sodium sulfate; then
    directing the concentrated dissolved ash solution to a crystallizer and cooling the concentrated dissolved ash solution to form a glaserite slurry and a mother liquor containing chloride;
    wherein cooling the concentrated dissolved ash in the crystallizer causes glaserite to precipitate from the concentrated dissolved ash solution and forms part of the glaserite slurry; and
    directing the glaserite slurry from the crystallizer.

13. The method of claim 12 wherein the glaserite slurry includes at least some chloride and wherein the method includes removing chloride from the concentrated dissolved ash solution by directing the glaserite slurry from the crystallizer.

14. The method of claim 12 wherein the mother liquor includes at least some chloride and the method includes recycling the mother liquor to the one or more evaporators.

15. The method of claim 12 including directing the glaserite slurry to a solid-liquid separator and separating the glaserite slurry into glaserite crystals and a liquid stream; and recycling the liquid stream to the crystallizer.

16. The method of claim 15 including mixing an aqueous solution with the glaserite crystals and leaching sodium sulfate from the glaserite crystals to form potassium sulfate.

17. The method of claim 16 including recycling the sodium sulfate leached from the glaserite crystals to the one or more evaporators.

18. The method of claim 12 including adiabatically cooling the concentrated dissolved ash solution in the crystallizer.

19. The method of claim 12 wherein the crystallizer is a flash crystallizer and cools the concentrated dissolved ash solution to approximately 35° C. which results in the crystallization of glaserite.

20. The method of claim 12 including purging at least a portion of the mother liquor to remove chloride.

21. The method of claim 12 wherein the mother liquor is directed from the crystallizer in a mother liquor stream, and wherein there is provided a purge stream that extends from the mother liquor stream and wherein the purge stream is utilized to remove chloride from the dissolved ash solution.

* * * * *